(12) United States Patent
Gharibi et al.

(10) Patent No.: US 11,973,743 B2
(45) Date of Patent: *Apr. 30, 2024

(54) SYSTEMS AND METHODS FOR PROVIDING A SYSTEMIC ERROR IN ARTIFICIAL INTELLIGENCE ALGORITHMS

(71) Applicant: TripleBlind, Inc.

(72) Inventors: Gharib Gharibi, Lenexa, KS (US); Babak Poorebrahim Gilkalaye, Kansas City, MO (US); Riddhiman Das, Parkville, MO (US)

(73) Assignee: TRIPLEBLIND, INC., Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/064,625

(22) Filed: Dec. 12, 2022

(65) Prior Publication Data
US 2023/0114573 A1    Apr. 13, 2023

Related U.S. Application Data

(63) Continuation of application No. 17/499,353, filed on Oct. 12, 2021, now Pat. No. 11,528,259, which is a
(Continued)

(51) Int. Cl.
*H04L 9/40* (2022.01)
*G06F 17/16* (2006.01)
(Continued)

(52) U.S. Cl.
CPC .......... *H04L 63/0428* (2013.01); *G06F 17/16* (2013.01); *G06F 18/2113* (2023.01);
(Continued)

(58) Field of Classification Search
CPC ... H04L 63/0428; H04L 9/008; H04L 9/0625; H04L 2209/46; G06F 17/16;
(Continued)

(56) References Cited

U.S. PATENT DOCUMENTS 1,045,208 A   11/1912  Spencer
5,410,696 A    4/1995  Seki et al.
(Continued)

FOREIGN PATENT DOCUMENTS

WO   WO 2021/119365   6/2021
WO   WO 2021/119367   6/2021

OTHER PUBLICATIONS

Lui et al., "Federated Forest", Arxiv.org, Cornell University Library, May 24, 2019, XP081662771, DOI: 10.1109/TBDATA.2020.2992755, Sections 3, 4, 5; Figure 1. (Year: 2019).
(Continued)

*Primary Examiner* — Moeen Khan

(57) ABSTRACT

Disclosed is a process for testing a suspect model to determine whether it was derived from a source model. An example method includes receiving, from a model owner node, a source model and a fingerprint associated with the source model, receiving a suspect model at a service node, based on a request to test the suspect model, applying the fingerprint to the suspect model to generate an output and, when the output has an accuracy that is equal to or greater than a threshold, determining that the suspect model is derived from the source model. Imperceptible noise can be used to generate the fingerprint which can cause predictable outputs from the source model and a potential derivative thereof.

19 Claims, 7 Drawing Sheets

Related U.S. Application Data continuation-in-part of application No. 17/176,530, filed on Feb. 16, 2021, which is a continuation-in-part of application No. 16/828,420, filed on Mar. 24, 2020, now Pat. No. 11,363,002, said application No. 17/176,530 is a continuation of application No. 16/828,354, filed on Mar. 24, 2020, said application No. 17/499,353 is a continuation-in-part of application No. 16/828,216, filed on Mar. 24, 2020, and a continuation-in-part of application No. 16/828,085, filed on Mar. 24, 2020, now Pat. No. 11,582,203.

(60) Provisional application No. 63/090,933, filed on Oct. 13, 2020, provisional application No. 62/948,105, filed on Dec. 13, 2019.

(51) Int. Cl.
| | |
|---|---|
| *G06F 18/2113* | (2023.01) |
| *G06F 18/24* | (2023.01) |
| *G06N 3/04* | (2023.01) |
| *G06N 3/082* | (2023.01) |
| *G06Q 20/40* | (2012.01) |
| *G06Q 30/0601* | (2023.01) |
| *H04L 9/00* | (2022.01) |
| *H04L 9/06* | (2006.01) |

(52) U.S. Cl.
CPC .............. *G06F 18/24* (2023.01); *G06N 3/04* (2013.01); *G06N 3/082* (2013.01); *G06Q 20/401* (2013.01); *G06Q 30/0623* (2013.01); *H04L 9/008* (2013.01); *H04L 9/0625* (2013.01); *G06Q 2220/00* (2013.01); *H04L 2209/46* (2013.01)

(58) Field of Classification Search
CPC ........ G06K 9/623; G06K 9/6267; G06N 3/04; G06N 3/082; G06Q 20/401; G06Q 30/0623; G06Q 2220/00
USPC .......................................................... 706/25
See application file for complete search history.

(56) References Cited

U.S. PATENT DOCUMENTS

| | | | |
|---|---|---|---|
| 6,353,816 | B1 | 3/2002 | Tsukimoto |
| 9,646,043 | B1 | 5/2017 | Aronvich |
| 10,002,029 | B1 | 6/2018 | Bequet |
| 10,362,001 | B2 | 7/2019 | Yan |
| 10,419,360 | B2 | 9/2019 | Dawson |
| 10,592,012 | B2 | 1/2020 | Dawson |
| 10,560,872 | B2 | 2/2020 | Dawson |
| 10,594,623 | B2 | 3/2020 | Dawson |
| 10,623,998 | B2 | 4/2020 | Dawson |
| 10,833,871 | B2 | 11/2020 | Ranellucci |
| 10,902,302 | B2 | 1/2021 | Fu |
| 10,924,460 | B2 | 2/2021 | Storm |
| 11,195,099 | B2 | 12/2021 | Luo |
| 11,316,676 | B2 | 4/2022 | Kinjo |
| 2006/0233377 | A1 | 10/2006 | Chang |
| 2008/0082636 | A1 | 4/2008 | Hofmann |
| 2008/0201721 | A1 | 8/2008 | Little |
| 2009/0063485 | A1 | 3/2009 | Schneider |
| 2010/0100864 | A1 | 4/2010 | Plants |
| 2010/0281254 | A1 | 11/2010 | Carro |
| 2011/0161091 | A1 | 6/2011 | Freishtat |
| 2012/0047097 | A1 | 2/2012 | Sengupta et al. |
| 2013/0124491 | A1 | 5/2013 | Pepper |
| 2013/0272377 | A1 | 10/2013 | Karczewicz |
| 2014/0108813 | A1 | 4/2014 | Pauker |
| 2014/0371902 | A1 | 12/2014 | McClelland |
| 2015/0242136 | A1 | 8/2015 | Lin |
| 2015/0288662 | A1 | 10/2015 | Bilogrevic |
| 2015/0371132 | A1 | 12/2015 | Gemello |
| 2016/0103901 | A1 | 4/2016 | Kadav |
| 2016/0294550 | A1 | 10/2016 | French |
| 2016/0335440 | A1 | 11/2016 | Clark |
| 2016/0342608 | A1 | 11/2016 | Burshteyn |
| 2017/0026342 | A1 | 1/2017 | Sidana |
| 2017/0116520 | A1 | 4/2017 | Min |
| 2017/0149796 | A1 | 5/2017 | Gvili |
| 2017/0372201 | A1 | 6/2017 | Gupta |
| 2017/0228547 | A1 | 8/2017 | Smith |
| 2017/0323196 | A1 | 11/2017 | Gibson |
| 2017/0359321 | A1 | 12/2017 | Rindal |
| 2018/0039884 | A1 | 2/2018 | Dalton |
| 2018/0041477 | A1 | 2/2018 | Shaposhnik |
| 2018/0330237 | A1 | 2/2018 | Yoshiyama |
| 2018/0129900 | A1 | 5/2018 | Kiraly |
| 2018/0157972 | A1 | 6/2018 | Hu |
| 2018/0227296 | A1 | 8/2018 | Joshi |
| 2018/0367509 | A1 | 12/2018 | O'Hare |
| 2019/0005399 | A1 | 1/2019 | Noguchi |
| 2019/0130265 | A1 | 5/2019 | Ling |
| 2019/0228299 | A1 | 7/2019 | Chandran |
| 2019/0286973 | A1 | 9/2019 | Kovvuri |
| 2019/0294805 | A1 | 9/2019 | Taylor |
| 2019/0312772 | A1 | 10/2019 | Zhao |
| 2019/0332944 | A1 | 10/2019 | Bai |
| 2019/0372760 | A1 | 12/2019 | Zheng |
| 2020/0036510 | A1 | 1/2020 | Gomez |
| 2020/0044862 | A1 | 2/2020 | Yadlin |
| 2020/0125933 | A1 | 4/2020 | Aldea Lopez |
| 2020/0158745 | A1 | 5/2020 | Tian |
| 2020/0184044 | A1 | 6/2020 | Zatloukal |
| 2020/0186528 | A1 | 6/2020 | Fan |
| 2020/0193279 | A1 | 6/2020 | Hostetler |
| 2020/0202184 | A1 | 6/2020 | Shrestha |
| 2020/0226284 | A1 | 7/2020 | Yin et al. |
| 2020/0228313 | A1 | 7/2020 | Storm |
| 2020/0265301 | A1 | 8/2020 | Burger |
| 2020/0286145 | A1 | 9/2020 | Storm |
| 2020/0296128 | A1 | 9/2020 | Wentz |
| 2020/0304293 | A1 | 9/2020 | Gama |
| 2020/0322141 | A1 | 10/2020 | Kinjo |
| 2020/0342288 | A1 | 10/2020 | Xi |
| 2020/0342394 | A1 | 10/2020 | Moore et al. |
| 2020/0372360 | A1 | 11/2020 | Vu |
| 2020/0394316 | A1 | 12/2020 | Boehler |
| 2020/0402625 | A1 | 12/2020 | Aravamudan |
| 2020/0410228 | A1* | 12/2020 | Wang ........................ G06N 3/04 |
| 2021/0019605 | A1 | 1/2021 | Rouhani |
| 2021/0026860 | A1 | 1/2021 | Wang |
| 2021/0035330 | A1* | 2/2021 | Xie .......................... G06N 5/04 |
| 2021/0064760 | A1* | 3/2021 | Sharma .................. G06F 21/577 |
| 2021/0117578 | A1 | 4/2021 | Cheruvu |
| 2021/0142177 | A1 | 5/2021 | Mallya |
| 2021/0150024 | A1 | 5/2021 | Zhang |
| 2021/0157912 | A1* | 5/2021 | Kruthiveti Subrahmanyeswara Sai ............. G06N 20/00 |
| 2021/0194668 | A1 | 6/2021 | Masters |
| 2021/0248268 | A1 | 8/2021 | Ardhanari |
| 2021/0266170 | A1 | 8/2021 | Rossi |
| 2021/0314140 | A1 | 10/2021 | Stephenson |
| 2021/0334621 | A1 | 10/2021 | Shimizu |
| 2021/0350357 | A1 | 11/2021 | Lafontaine |
| 2021/0357859 | A1 | 11/2021 | Malvankar |
| 2021/0374502 | A1 | 12/2021 | Roth |
| 2021/0385069 | A1 | 12/2021 | Reid |
| 2021/0406386 | A1 | 12/2021 | Ortiz |
| 2022/0004654 | A1 | 1/2022 | Patel |
| 2022/0012672 | A1 | 1/2022 | Inman |
| 2022/0038271 | A1 | 2/2022 | Ranellucci |
| 2022/0050921 | A1 | 2/2022 | LaFever |
| 2022/0051276 | A1 | 2/2022 | Zelocchi |
| 2022/0108026 | A1 | 4/2022 | Ortiz |
| 2022/0121731 | A1 | 4/2022 | Growth |
| 2022/0247548 | A1 | 8/2022 | Boehler |

(56) References Cited

OTHER PUBLICATIONS

Ads et al., "Multi-limb Split Learning for Tumor Classification on Vertically Distributed Data", Date of Conference: Dec. 5-7, 2021, IEEE (Year: 2021).

Brisimi et al. "Federated learning of predictive models from federated electronic health records", International Journal of Medical Informatics, Apr. 2018, retrieved on Jan. 18, 2021 from http://www.ncbi.nlm.nih.gov/pmc/articles/PMC5836813/pdf/nihms936798.pdf.

Thapa et al., "SplitFed: When Federated Learning Meets Split Learning", Cornell University Library/Computer Science/Machine Learning, Apr. 25, 2020, [online] [retrieved on Dec. 15, 2021] Retrieved from the Internet URL:arXiv:2004, 12088v, entire document.

Abedi, Ali, and Shehroz S. Khan. "FedSL: Federated Split Learning on Distributed Sequential Data in Recurrent Neural Networks", arXiv preprint arXiv:2011.03180 (Year 2021).

Nir Bitansky et al., "Post-quantum Zero Knowledge in Constant Rounds"; Jun. 2020; 48 pages (Year 2020).

\* cited by examiner

SYSTEMS AND METHODS FOR PROVIDING A SYSTEMIC ERROR IN ARTIFICIAL INTELLIGENCE ALGORITHMS

PRIORITY CLAIM

This application is a continuation of U.S. patent application Ser. No. 17/499,353, filed Oct. 12, 2021, which is a non-provisional patent application of U.S. Provisional Application No. 63/090,933, filed on Oct. 13, 2020, which is incorporated herein by reference.

This application is a continuation of U.S. patent application Ser. No. 17/499,353, filed Oct. 12, 2021, which is a continuation-in-part of U.S. patent application Ser. No. 16/828,085, filed Mar. 24, 2020, which claims the benefit of U.S. Provisional Application No. 62/948,105, filed Dec. 13, 2019, which is incorporated herein by reference.

This application is a continuation of U.S. patent application Ser. No. 17/499,353, filed Oct. 12, 2021, which is a continuation-in-part of U.S. patent application Ser. No. 16/828,216, filed Mar. 24, 2020, which claims the benefit of U.S. Provisional Application No. 62/948,105, filed Dec. 13, 2019, which is incorporated herein by reference.

This application is a continuation of U.S. patent application Ser. No. 17/499,353, filed Oct. 12, 2021, which is a continuation-in-part of U.S. patent application Ser. No. 17/176,530, filed Feb. 16, 2021, which is a continuation of U.S. patent application Ser. No. 16/828,354, filed Mar. 24, 2020, now U.S. Pat. No. 10,924,460, issued on Feb. 16, 2021, which claims the benefit of U.S. Provisional Application No. 62/948,105, filed Dec. 13, 2019, which is incorporated herein by reference.

This application is a continuation of U.S. patent application Ser. No. 17/499,353, filed Oct. 12, 2021, which is a continuation-in-part of U.S. patent application Ser. No. 16/828,420, filed Mar. 24, 2020, which claims the benefit of U.S. Provisional Application No. 62/948,105, filed Dec. 13, 2019, which is incorporated herein by reference.

This application is a continuation of U.S. patent application Ser. No. 17/499,353, filed Oct. 12, 2021, which is a continuation-in-part of U.S. patent application Ser. No. 17/180,475, filed Feb. 19, 2021, which claims the benefit of U.S. Provisional Application No. 63/020,930, filed May 6, 2020, which is incorporated herein by reference.

TECHNICAL FIELD

The present disclosure generally relates to training neural networks and artificial intelligence or machine learning algorithms or models in which a systematic weakness of a given algorithm is utilized to craft adversarial inputs along with their random labels to identify whether a competitor has used a different model trained on the algorithm outputs.

BACKGROUND

Artificial intelligence or machine learning models are used in many areas of our lives. For example, Google searches use models to determine what type of search results to return to individual users. Speech processing technologies use trained models to be able to recognize speech. In another aspect, artificial intelligence or machine learning models can be used as diagnostic tools for medical applications. Medical images such as x-rays or MRIs can be submitted to a trained model to receive a diagnosis. Training data can be used to train the model to identify, for example, cancer or other medical issues that might be recognized within the images.

Some companies develop artificial intelligence or machine learning models to aid in detecting medical issues. They provide these models as a service to hospitals for an appropriate fee.

In one example, a company could train a model to diagnose a disease with high accuracy. The company could sell the model or offer the model as a diagnostic tool to Hospital A. Each time Hospital A has a patient, the technicians submit the patient data to the trained model to obtain a diagnosis. Hospital A pays the company for the use of the trained model. Over time, Hospital A can accumulate enough of their own data (i.e. input data and output results) that they could use to train their own model. In the end, Hospital A could simply use the output from the trained model to create a new "training set". The training set would be the input/output data and "labels" used to classify the various data. Hospital A could then use their own model to do their own diagnosis and no longer pay the company that provided the original model. This approach is unfair to the company that developed the model and utilizes their intellectual property embodied in the original model in an inappropriate way.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

INTRODUCTION

Figure 1:
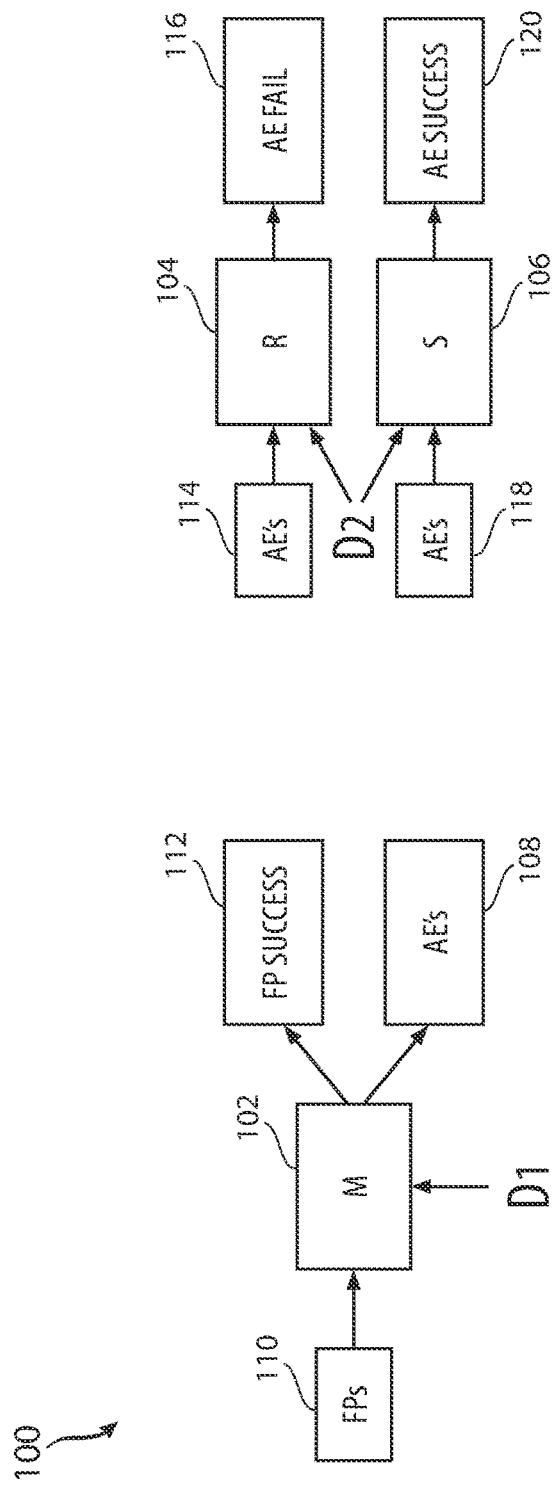
FIG. 1 illustrates an example training approach for generating a set of fingerprints.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Overview

The present disclosure outlines an approach to solve the problems outlined above. As noted above, there is a potential of end-users to provide input data to a model and obtain output data which can then be used to train a separate model of their own. The approach disclosed herein exploits an already-existing weakness in the algorithms and crafts adversarial inputs (bad inputs) that have the ability to use this weakness of the algorithm in predictable ways. The general goal of this disclosure is to determine if someone has "copied" a trained artificial intelligence (AI) algorithm or source model using what are called fingerprints. Technically, an adversary can copy the knowledge associated with a source algorithm and embed it in a very different neural network algorithm. Then the adversary can argue that their model and the source model are very different architecturally, even though their knowledge is the same. Such an approach by the adversary can unfairly be the equivalent of taking the original model without compensation. The approach disclosed herein will enable a user to use a fingerprint or other approach to determine whether a suspect model was derived from a source model and thus copied.

An example fingerprint is an image of a dog that includes targeted noise such that when the image is input to a model, the model classifies the image as an image of a frog because of the noise. The fingerprint can represent the noise added to the image to cause the model to classify the image in a predicable but incorrect way as a frog (instead of a dog). This can be done, for example, by changing a color in the image, manipulating the value of a pixel, or changing other data. This fingerprint can be used to detect whether a suspect model was derived from a source model by running the fingerprint image through both models to see if both misclassify the noisy image of the dog (the fingerprint) the same way—as a frog. The principles disclosed herein can apply to any kind of trained model or trained algorithm.

The overall general process introduced herein includes a system extracting a group of inputs that are correctly classified by an original model with a confidence score below a given threshold. The system generates adversarial examples from the extracted inputs (i.e., adds noise to generate fingerprint candidates) and selects the adversarial examples or fingerprint candidates that transfer from the source model to the surrogate models but not reference models. The selected group is the final set of fingerprints used to determine whether an adversary model is embedded with the knowledge or data gained from the original model.

Various embodiments can be disclosed herein. For example, in one aspect, a method can relate to a process of generating and verifying a set of fingerprints that are used to test a suspect model to see if it was derived from a source model. Another aspect of this disclosure can be the process of testing the suspect model using the existing fingerprint or set of fingerprints. Other aspects can include systems or devices for performing any of the various functions disclosed. Some embodiments might be defined from the standpoint of a model owner or from the standpoint of a model testing service. For example, such embodiments might include the functions as performed by a respective node or device.

One example method which addresses the steps for generating a set of fingerprints can include generating, based on a training dataset, a reference model and a surrogate model, extracting a group of inputs that are predicted correctly but with low confidence scores based on a threshold by a source model, generating adversarial examples from the group of inputs by adding noise to each input of the group of inputs using different methods, and selecting a subgroup from the adversarial examples that transfer to the surrogate model but not to the reference model.

The method can further include testing the noisy group of adversarial examples against the source model to obtain a set of source model successful adversarial examples that the source model predicts correctly, testing the set of source model successful adversarial examples against the reference model to yield a set of reference model adversarial examples, testing the set of source model successful adversarial examples against the surrogate model to yield a set of surrogate model adversarial examples. The method can include identifying a set of fingerprints based on which ones from the set of source model successful adversarial examples, the set of reference model adversarial examples and the set of surrogate model adversarial examples pass as adversarial examples against the source model and the surrogate model, but not the reference model. The method can include any one or more of the steps performed in any order.

An example method which focuses on the testing process for determining whether a suspect model is derived from the source model can include receiving, from a model owner node, a source model and verification key at a service node, receiving a suspect model at the service node and transmitting a request to the model owner node for a proof of ownership relative to the suspect model. In response to the request, the method can include receiving a marking key at the service node from the model owner node and, based on the marking key and the verification key, determining whether the suspect model was derived from the source model.

Another example method can include receiving, from a model owner node, a source model and a fingerprint associated with the source model, receiving a suspect model at a service node, based on a request to test the suspect model, applying the fingerprint to the suspect model to generate an output and, when the output has an accuracy that is equal to or greater than a threshold, determining that the suspect model is derived from the source model.

Other embodiments can include systems or devices which perform the functions described herein. For example, an example system can include a processor and a computer-readable storage device which stores instructions which, when executed by the processor, cause the processor to perform operations including generating, based on a training dataset, a reference model and a surrogate model, selecting datapoints from the training dataset that are predicted correctly by a source model as a group of adversarial candidates, selecting from the group of adversarial candidates a sub-group of candidates that each have a low confidence score according to a threshold to yield a sub-group of adversarial candidates and adding noise to each candidate of the sub-group of adversarial candidates to yield a noisy group of adversarial candidates.

The instructions can further cause the processor to perform additional operations including testing the noisy group of adversarial candidates against the source model to obtain a set of source model successful adversarial examples that the source model predicts correctly, testing the set of source model successful adversarial examples against the reference model to yield a set of reference model adversarial examples, testing the set of source model successful adversarial examples against the surrogate model to yield a set of surrogate model adversarial examples and identifying a set of fingerprints based on which ones from the set of source model successful adversarial examples, the set of reference model adversarial examples and the set of surrogate model adversarial examples pass as adversarial examples against the source model and the surrogate model, but not the reference model.

An example system which focuses on the testing process for determining whether a suspect model is derived from the source model can include a processor and a computer-readable storage device that stores instructions which, when executed by the processor, cause the processor to perform operations including receiving, from a model owner node, a source model and verification key at a service node, receiving a suspect model at the service node and transmitting a request to the model owner node for a proof of ownership relative to the suspect model. In response to the request, the operations can include receiving a marking key at the service node from the model owner node and, based on the marking key and the verification key, determining whether the suspect model was derived from the source model.

Another example system can include a processor and a computer-readable storage device that stores instructions which, when executed by the processor, cause the processor to perform operations including receiving, from a model owner node, a source model and a fingerprint associated with the source model, receiving a suspect model at a service node, based on a request to test the suspect model, applying the fingerprint to the suspect model to generate an output and, when the output has an accuracy that is equal to or greater than a threshold, determining that the suspect model is derived from the source model.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

DETAILED DESCRIPTION

Disclosed herein is a new system, a platform, compute environment, cloud environment, marketplace, or any other characterization of the system that will enable an improved approach to training neural networks. In one aspect, the approach is called a federated-split leaning approach that combines features from known approaches but that provides a training process that maintains privacy for data used to train the model from various client devices. Thus, entities that have models that they desire to be protected can provide a dataset that provides some or all of the data used to train their source model for use in developing the shadow models. In one aspect, only a computer system receives the data and generates the shadow models. In other words, in one aspect, no human is able to access the received dataset used to develop the shadow models.

The general concept disclosed herein is illustrated by an example method. An example method includes receiving, from a model owner node, a source model and a fingerprint (noisy input producing an expected misclassification by a model) associated with the source model and receiving a suspect model at a service node. Based on a request to test the suspect model, the method includes applying the fingerprint to the suspect model to generate an output and, when the output has an accuracy that is equal to or greater than a threshold, determining that the suspect model is derived from the source model. Imperceptible noise can be used to generate the fingerprint which can cause predictable outputs from the source model and a potential derivative thereof.

In order to be able to use the fingerprint to test the suspect model above, the fingerprint will be generated as follows. A system extracts a group of inputs that are correctly classified by an original model with a confidence score below a given threshold. These can be called adversarial candidates. The system generates adversarial examples from the adversarial candidates (i.e., adds noise to generate fingerprint candidates) and selects the adversarial examples or fingerprint candidates that transfer (or are conferred) from the source model to the surrogate models but not reference models. The selected group includes a fingerprint or fingerprints used to determine whether an adversary model is embedded with the knowledge or data gained from the original model.

FIG. 1 illustrates the overall process 100 for generating fingerprints which can be used to test suspect models. The overall process includes three major steps. The first step involves generating shadow models, the second step involves constructing adversarial examples from the source model and shadow models and the last step involves extracting and verifying set of fingerprints from the adversarial examples. FIG. 1 illustrates the generating of shadow models (called a reference model R 104, and a surrogate model S 106). In order to create and verify a set of fingerprints for a given source model M 102, first two shadow models: a reference model R 104 and a surrogate model S 106 need to be trained. The source model M 102 is the model to be protected by insuring that it is not copied or the data learned from its use is not used to train another neural network algorithm. The scenario typically is that an entity generates a source model M 102 for use, for example, by a hospital to evaluate medical images such as x-rays or MRIs. The entity desires to protect that source model M 102 such that the client cannot over time obtain their own data and simply train their own model based on the source model M 102 and thus deprive the entity of the benefit and income from their research and development of the source model.

The reference model R 104 is a model that is trained independently from the source model M 102 using a similar but different dataset. The reference model R 104 might use the same neural network architecture and same parameters as the source model M 102, but it does not utilize or transfer any knowledge from the source model M 102. The surrogate model S 106 is a model that was proven to be derived from the source model M 102.

Let $D_1$ be the dataset used for training the source model M 102. Let $D_2$ be a dataset from the same distribution of $D_1$, which might also overlap with it. In one example, the data $D_2$ might be data used by an entity to test their source model M 102, but not to train. There might be some data that could have been also used to train the source model M 102 that is also included in $D_2$. In another aspect, $D_1$ could be the same as $D_2$. However, the entity owning the source model M 102 might not want to share $D_2$. $D_2$ will be used to train both shadow models, i.e., the reference model R 104 and the surrogate model S 106. $D_2$ can be provided by the model builder or the entity requesting a service provider to protect the intellectual privacy of their model, while enabling people access to use the model. The incorporated patent applications describe processes that enable models and data to operate together without revealing either the data or the models to the different parties that provided respectively the models and data.

Several surrogate models S 104 could be developed for different types of adversarial attacks. The approach involves modelling the various types of attacks that could occur against the source model M 102. Thus, these various models can be built to address different attack approaches. The approach seeks to mimic an attacker and so the process involves building surrogate models that are in essence trying to steal the source model M 102.

The surrogate model S 106 can be trained using a number of different approaches including a distillation process. For example, Hinton, G., Vinyals, O. and Dean, J., Distilling the Knowledge in a Neural Network, 9 Mar. 2015 (arXiv: 1503.02531), incorporated herein by reference, can be used to generate the surrogate model S 106. The distillation process utilizes a pretrained model, named a teacher model, used to generate soft labels to train a new model, named a student model. Specifically, the student model has access to a dataset that is not labeled, $D_2$, and also has access (either white- or black-box access) to a trained model, a teacher, that is capable of labeling the datapoints of $D_2$. Using the labels generated by the teacher model, the student model learns the teacher model's behavior and becomes trained on its own dataset, $D_2$. While the distillation process is often used to improve a model's accuracy or compress a large model, teacher model, into a smaller one, student model, it is also one of the most common approaches to copy ("steal") the behavior of a model. Thus, in this disclosure the distillation process that is applied as the example process to generate the surrogate model.

Constructing adversarial examples is discussed next. This approach utilizes the weakness of a given model, source model M 102, by constructing a set of adversarial examples that transfer to a new model, the surrogate model S 106, derived from the source model M 102, but do not transfer to other independently-trained models such as the reference model R 104.

In one example step, the system selects all datapoints that source model M 102 predicts correctly as adversarial examples. In other words, if images of dogs are processed by the source model M 102, the output or classification of the images should also reference dogs. Out of the correctly predicted datapoints (images correctly classified as dogs), the system selects the ones with the least confidence scores or probability. For example, if 100 images of dogs (The $D_2$ data) are processed by the source model M 102, assume that 90 were properly classified as dogs. Assume that of the 90 properly classified images, that 50 of those had a confidence score or probability value equal to or larger than 0.65. The remaining 40 of the images were properly classified but had a confidence score that was lower than 0.65. This set of 40 images can constitute the set of all possible adversarial examples. The threshold of 0.65 of course is provided only by way of example. Various thresholds can be identified.

In another aspect, the system can apply noise to the subset of inputs selected above (the 40 images that were classified correctly but has a confidence score lower than a threshold, or adversarial candidates) and then put them through different algorithms to generate different adversarial examples. The different algorithms can add different noise to each of the 40 images such that different buckets or types of adversarial examples are generated. Not every adversarial example is a good fingerprint however. These 40 images each having noise can then be processed by the source model M 102, the reference model R 104 and the surrogate model S 106. The system will pick those that transfer from the source model M 102 to the surrogate model S 106 but that will not work with the reference model R 104. This can be an alternate approach to obtaining the final set of fingerprints. Assume, for example, that 30 of the 40 images with noise properly transfer from the source model M 102 to the surrogate model S 106 but not to the reference model R 104. For example, for image number 12 of a dog with noise that should cause the model to classify the image as a frog, when the source model M 102 processing image number 12 outputs frog, the surrogate model S 106 processing image number 12 outputs frog and the reference model R 104 processing image number 12 outputs dog (or some other output such as cat or squirrel), then the image number 12 is transferrable or conferrable and can be used as a fingerprint. The final set of fingerprints would be, for example, the 30 noisy images out of the 40 example images.

In one aspect, this process of running example images through the different algorithms to generate different adversarial examples can be done based on a subset of the 90 images that have the lower confidence scores as described above. When the system uses accurately classified images from the source model M 102, but that have lower confidence scores, smaller amounts of noise can be used to trick the models into misclassifying the image. In comparison, if the system used adversarial example images with strong or high classification confidence, it would take more noise (which could become perceptible) to trick the models into a misclassification.

The general principle disclosed herein is that of the successfully classified images, a subset is determined based on lower confidence scores. These can be called a sub-group of adversarial candidates. Again, this subgroup of adversarial candidates are those that the source model M 102 correctly classifies with a low confidence score according to a chosen threshold. How difficult the developers want the fingerprints to be can drive the level of the threshold.

This sub-group of adversarial candidates is then processed to add noise to each example of the sub-group of adversarial candidates to yield a noisy group of actual adversarial inputs, adversarial examples, or fingerprint candidates. Adding noise to each adversarial candidate can occur in a number of different ways. Color or pixel values within an image or other characteristics might be altered slightly. Numbers relative to the data in an input might be slightly altered to add the noise. The particular way in which the noise is added is not necessarily a specific requirement of this disclosure. However, the general principle is that the added noise should be imperceptible to a viewer but the noise can be directed to the weakness of the source model M 102 such that a different output is the result of processing and noisy input.

For example, an image of a dog could be adjusted with respect to its color such that a classification model classifies the image of the dog as an image of a frog. Each example of the sub-group of adversarial candidates is modified to add to the noise and the noisy group of adversarial examples (fingerprint candidates) is then tested against the source model M 102 to obtain a set of source model successful adversarial examples that the source model predicts correctly. Note that in this case, the word "correctly" means that the source model predicts the noisy data as frogs as expected and not dogs as is actually shown in the image. The success in this case means that the exploited weakness of the source model M 102 as illustrated by the output misclassifying model input as a frog as expected rather than the dog. An adversarial example is an input with imperceptible noise that causes the model to misclassify the input. Assume that of the 40 adversarial examples, that 30 of the examples are misclassified "correctly", or as expected, the dog as a frog. The system keeps the adversarial examples that lead to adversarial attack accuracy of 100%. These 30 examples result in the set of source model successful adversarial examples 108. These can then be considered to be the fingerprints 110 that will be used to ultimately test suspect models. In one example, a fingerprint is a confirmable example that was verified to be a fingerprint by virtue of being a transferable adversarial candidate such that it was generated using the source model M 102, the model S 106 but not the reference model R 104.

Next, extracting and verifying the set of fingerprints 110 is described. Once the set of all successful adversarial examples 108 is identified, this set of adversarial examples (AEs) 114, 118 is tested against the reference model R 104 and surrogate model S 106 110. In particular, the method uses the set of successful adversarial examples 108 on source model M 102 as the input dataset 114, 118 to reference model R 104 and surrogate model S 106, which will be used to construct the set of fingerprints 110. The process involves testing their transferability and only keeping those that pass as adversarial examples against the surrogate model S 106 and the reference model R 104. The concept of transferability of an adversarial example involves an adversarial example that was created using one model and its behavior (predicted classification output) extends to other models.

The method then involves selecting the set of fingerprints examples 110 that are "conferrable," meaning that the fingerprint candidate transfers from the source model M 102 to the surrogate model S 106 but not from the source model M 102 to the reference model R 104. In one aspect, the conferrable fingerprint candidates are the true examples that would be used to determine if the knowledge of a model has been copied and embedded in a different neural network algorithm. This process can be based on which adversarial candidates fail or are successful in the reference model R 104 and the surrogate model S 106. For example, the fingerprints are chosen from adversarial examples which fail 116, when processed by the reference model R 104, to classify the dog as a frog. The fingerprints are further chosen based on the surrogate model S 106 successfully "classifying" the dog images as frogs 120. A true example is an adversarial example that is conferrable meaning it is generated using the source model M 102 and transfers to the surrogate model S 106 but not to the reference model R 104.

Finally, the verification process in both approaches is very similar. The system uses the set of generated fingerprints 110 and their labels to test accuracy on these fingerprints. The labels associated with the fingerprints 110 represent the data which can include the noise and which causes a model to output a classification of the image as a frog. For example, the labels or the verification keys are the wrong labels causing the model to misclassify a dog as a frog. A suspect model is considered to be a surrogate model if and only if its overall accuracy on the fingerprints is equal to or greater than a given threshold. A target model or suspect model is one that is suspected to be derived from the source model M 102. An accuracy rate could be set at 0.60 (an accurate of 60%) or 0.70 to determine whether a suspect model is derived from the source model. An adversary is an entity such as a company that has access to the source model M 102 in that it can use that access to produce a suspect model.

In one aspect, the "noise" is an error or finding the difference in the probability space from the correct prediction of the image to the next nearest label if the system adds a little bit of noise. The question is how does one find the distance from the correct label to the next not-correct label in the probability distribution. A little random noise can be added to determine if the model fails or not. In some cases, the system may determine how the probability model is changing after every iteration of adding a bit of noise at each iteration. When the model starts to output frog rather than dog, then the system can determine that the right amount of noise has been added. A noisy version of the image is finally produced that misclassifies the image as frog rather than dog. In one example, the data changed can be numbers associated with the image. The images are fed as numbers so the values of the numbers or pixels (color values) can be adjusted or changed to add the noise. In this overall approach, it is computationally expensive to generate noise from different approaches when creating the final set of fingerprints.

In another aspect, generating the set of fingerprints can further include using other data examples outside the current distribution that is described above. For example, if one is trying to classify X-rays, the system could include using CT brain scans, and add noise to those scans, and see how the models react to the inputs from outside the current distribution. Thus, the process can include accessing additional data that has some correlation to the specific data distribution described above but is outside of that distribution.

Another aspect of this disclosure provides a much stronger solution against what is called "non-trivial ownership". Specifically, one adversarial-based approach is described in Lukas, N., Zhang, Y. and Kerschbaum, F., Deep Neural Network Fingerprinting by Conferrable Adversarial Examples, 2 Dec. 2019 (arXiv:1912.00888), incorporated herein by reference. In that approach, the system can track and identify a surrogate model using the extracted fingerprints. The approach in the Lukas et al. paper does not provide any means to prevent others from generating very similar fingerprints and claiming ownership of the target model. To address this problem, this disclosure uses in one example a cryptographic technique to preserve the set of fingerprints 110. The approach uses one-way functions (such as, for example, cryptographic hash functions like SHA-256) provided to a trusted-third party that can later challenge adversaries claiming ownership of a specific model. A hash function can be used to map data of arbitrary sizes to fixed-size values. The values returned by a hash function can be called hash values, hash codes, digests, or hashes. No one can claim ownership of a model because someone can take a proposed fingerprint, run the fingerprint through the hash. The resulting hash will not match a hash held by a trusted third party for that fingerprint. The time stamps of the original hash and the time stamp of the hash of a potential adversary can at least in part cause the hash data to differ. In another aspect, it would be very difficult to reproduce exactly the same fingerprints by an adversary to those original fingerprints that were generated. Therefore, the differences in the hash values can further be based on even very small differences in the data between the known fingerprint and a proposed fingerprint. For example, if the system adds random noise to the different images making up the fingerprint, then if an adversary tries to duplicate that fingerprint, they would have to get all of the pictures exactly the same to produce the same hash. If one image of 100 images in a fingerprint had a very small difference in a value, the hash would be different, and then new adversaries cannot claim ownership of the model even if their fingerprints are correct. The hashing makes sure that the set of fingerprints belong to original owner.

A hash function takes an input as a key, which is associated with a datum or record and used to identify it to the data storage and retrieval application. The keys may be fixed length, like a integer, or variable length, like a name. In some cases, the key is the datum itself. The output is a hash code used to index a hash table holding the data or records, or pointers to them. A hash function may be considered to perform three functions: (1) Convert variable length keys into fixed length (usually machine word length or less) values, by folding them by words or other units using a parity-preserving operator like ADD or XOR; (2) Scramble the bits of the key so that the resulting values are uniformly distributed over the key space; and (3) Map the key values into ones less than or equal to the size of the table.

In particular, the approach disclosed herein can require that the party generating the fingerprints to share a hashed version of the fingerprints and expected predictions with a trusted-third party whenever the source model is shared publicly. In this way, the system not only generates a set of fingerprints 110 that enables the system to prove ownership in the future, but also prevent others from, falsely, claiming ownership over the source model M 102. When a party claims an ownership of a specific model, they will be required to generate a hash of their fingerprints, which will be compared with the original hash of the fingerprints available at the public trusted-third party specific to the model under investigation. Failure to match the hashed fingerprints indicates a false accusation.

The following provides details on the experiments to confirm the desirability of the process is described herein. An example dataset used for the experiments herein is the CINIC dataset. This dataset consists of ~270,000 colored images of 32×32 pixels over 10 classes (same as CIFAR-10). The dataset was created by augmenting CIFAR10 with 210,000 images from the 10 classes from ImageNet. One of skill in the art will understand how to access the CINIC dataset. The source model M 102 was trained using 90,000 images from the CINIC database. The CINIC dataset includes images from a CIFAR-10 dataset (60,000 images) and a selection of images from the ImageNet database (210,000 images). CINIC is a bridge between these two databases used for benchmarking machine learning applications and has three subsets, one each for training, validation and testing. Each subset consists of 90,000 images. Table 1 illustrates example accuracy and epoch numbers. An epoch means that each sample in the training dataset has had an opportunity to update internal model parameters. The number of epochs is a hyperparameter that defines the number times that the learning algorithm will work through the entire training dataset.

TABLE 1

| Model Architecture | Accuracy (test) | Epochs |
| --- | --- | --- |
| ResNet50 | 78.56% | 50 |
| ResNet18 | 77.88% | 50 |
| ResNet20 | 78.45% | 50 |

The surrogate model S 106 was generated, as mentioned above, using distillation as one example approach go generating the surrogate model S 106. The process was done using an open-source tool called "Distiller" available through the github.com website. Other tools can also be used to generate the surrogate model S 106. Table 2 illustrates the source model, surrogate, accuracy and epochs data.

TABLE 2

| Source model | Surrogate | Accuracy | Epochs |
| --- | --- | --- | --- |
| ResNet50 (78.56%) | ResNet18 | 80.37 (D1) | 50 |
| ResNet50 (78.56%) | ResNet18 | 83.45 (D2) | 50 |
| ResNet20 (78.45%) | Resnet20 | 78.10 (D2) | 50 |
| ResNet20 (78.45%) | Resnet8 | 75.05 (D2) | 50 |
| ResNet20 (78.45%) | Resnet56 | 78.82 (D2) | 50 |
| ResNet20 (78.45%) | VGG16 | 78.72 (D2) | 50 |
| ResNet20 (78.45%) | VGG19 | 78.43 (D2) | 50 |

The reference model R 104 was trained as new models on the data $D_2$ without distillation and Table 3 provides the architecture, accuracy and epoch numbers for this process.

TABLE 3

| Model Architecture | Accuracy (test) | Epochs |
| --- | --- | --- |
| ResNet50 | 75.07 | 30 |
| ResNet18 | 77.89 | 30 |
| VGG16 | 77.24 | 50 |
| VGG18 | 77.89 | 50 |

The process of generating the adversarial examples 108 is discussed further. The BIM (Basic Iterative Method) was used to generate adversarial examples, using the following hyperparameters: epsilon: 0.10, iteration 100, bz=64, step=0.05, out of ~77 k correctly classified images. BIM is an adversarial generation method that adds small amounts of calculated noise over a number of steps, where the noise from each previous step is aggregated and clipped with the noise in the next step to keep the output of the adversarial example very close to the original method. The inventors of the present disclosure found the following adversarial examples:

SOURCE model accuracy on 76,747 adversarial examples: 11.30%

Adversarial attack accuracy: 88.70 based on 68,075 successful examples

REFERENCE accuracy on 76,747 adversarial examples: 61.61%

Adversarial attack accuracy: 38.39 based on 29,463 successful examples

SURROGATE accuracy on 76,747 adversarial examples: 42.14%

Adversarial attack accuracy: 57.86 based on 44,409 successful examples

Figure 2:
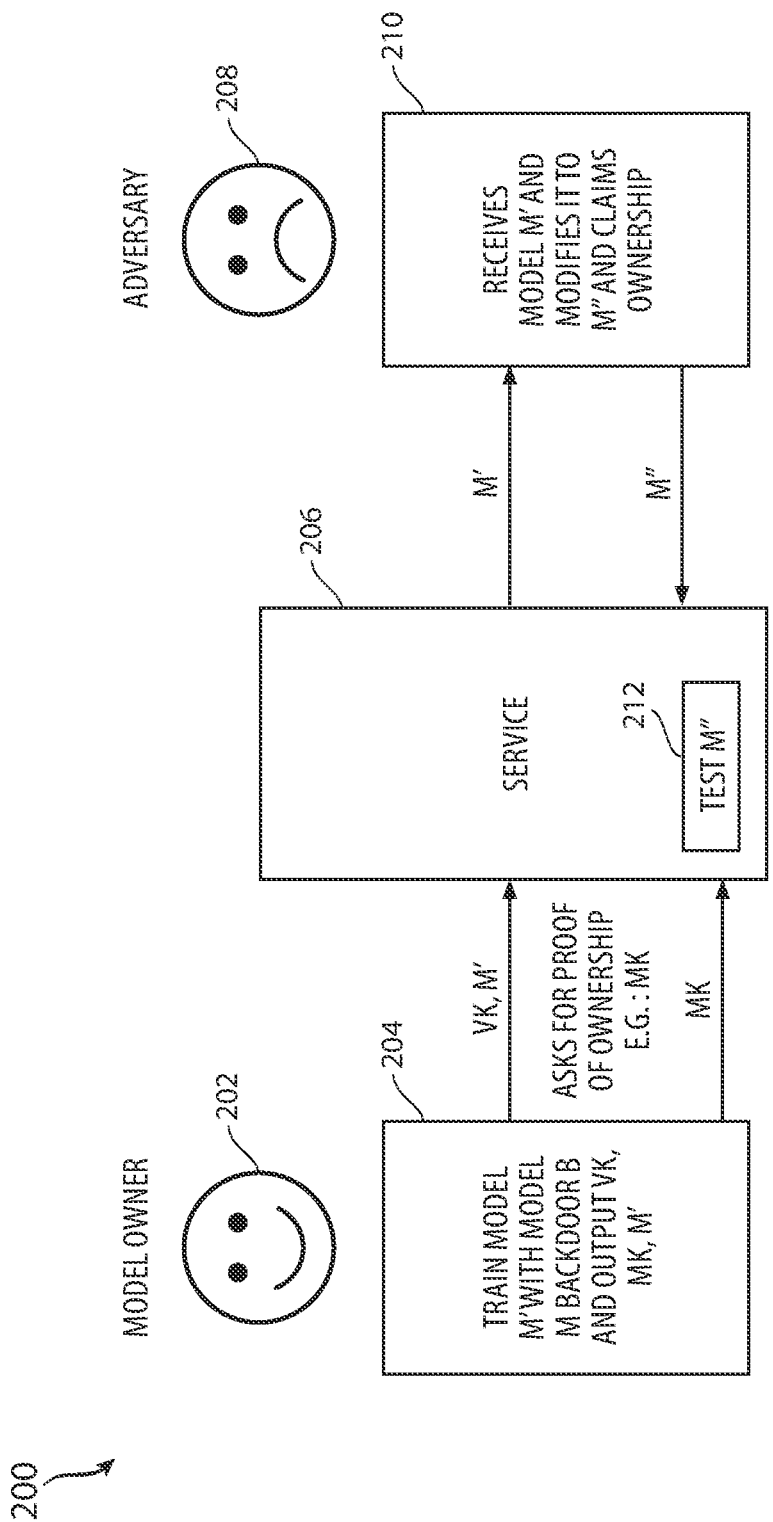
FIG. 2 illustrates an example network for testing whether a suspect model was derived from a source model.

FIG. 2 illustrates a framework 200 that includes key generation, marking and verification processes according to some aspects of this disclosure. In one aspect, a model owner 202 can train 204 a model M' with model M backdoor b an output vk (a verification key) and mk (a watermarking key) and M'. The output is a randomly generated trigger set along with random labels as part of key generation. $T_L$: T→L are the labels for the trigger set. L represents the label space, T is the trigger set or a random set which is a subset of D (the input space) that is randomly chosen to use for backdooring purposes. B is the backdoor (T, $T_L$). $T=\{t_1, t_2, \ldots t_n\}$, $T_L=\{T_{L1}, T_{L2}, \ldots T_{Ln}\}$.

The system can also generate second random strings r. $R=\{r_1, r_2, \ldots r_{2n}\}$ Let:

$$C_t=\{c_{t1}=\text{Hash}(t_1\|r_1), \ldots, c_{tn}=\text{Hash}(t_n\|r_n)\}$$

$$C_L=\{c_{L1}=\text{Hash}(T_{L1}\|r_{n+1}), \ldots, c_{Ln}=\text{Hash}(T_{Ln}\|r_{2n})\}.$$

Let a marking key be: mk=(b, R) and the verification key be vk: ($C_t$, $C_L$).

The marking process is described next. The system 204 computes a backdoor model M' from a source model M and b, the backdoor data (T, $T_L$). The system sends the verification key vk and the model M' to a trusted party or service 206. The service 206 does not learn anything from the verification key as all values are hash values if the later during the verification, the service 206 can verify this model belonging to the true owner 202.

A verification process is described next. The first step is to check if M(x): x∈T is not equal to a ground truth, which is the actual true label of the original. The second step is to verify that $C_T$, $C_L$ are the hashed values of the T, $T_L$ appended to the R, the set of generated strings referred to above. Finally, the last step is to verify whether M(x): x∈T is equal to the provided $T_L$ with good probability according to a threshold value. In this case, when an adversary 208 receives the model M' and modifies it to create a suspect model M", and then claims ownership of the model M', the service 206 can request a proof of ownership from the model owner 202 and receive the watermarking key mk. The server 206 can then test M" 212 using mk and vk. Using the principles disclosed herein, it can be determined whether M" was derived from M'.

Note that as model owners update their models, the process would need to be performed again such that a new fingerprint or set of fingerprints are generated for each model update.

Figure 3:
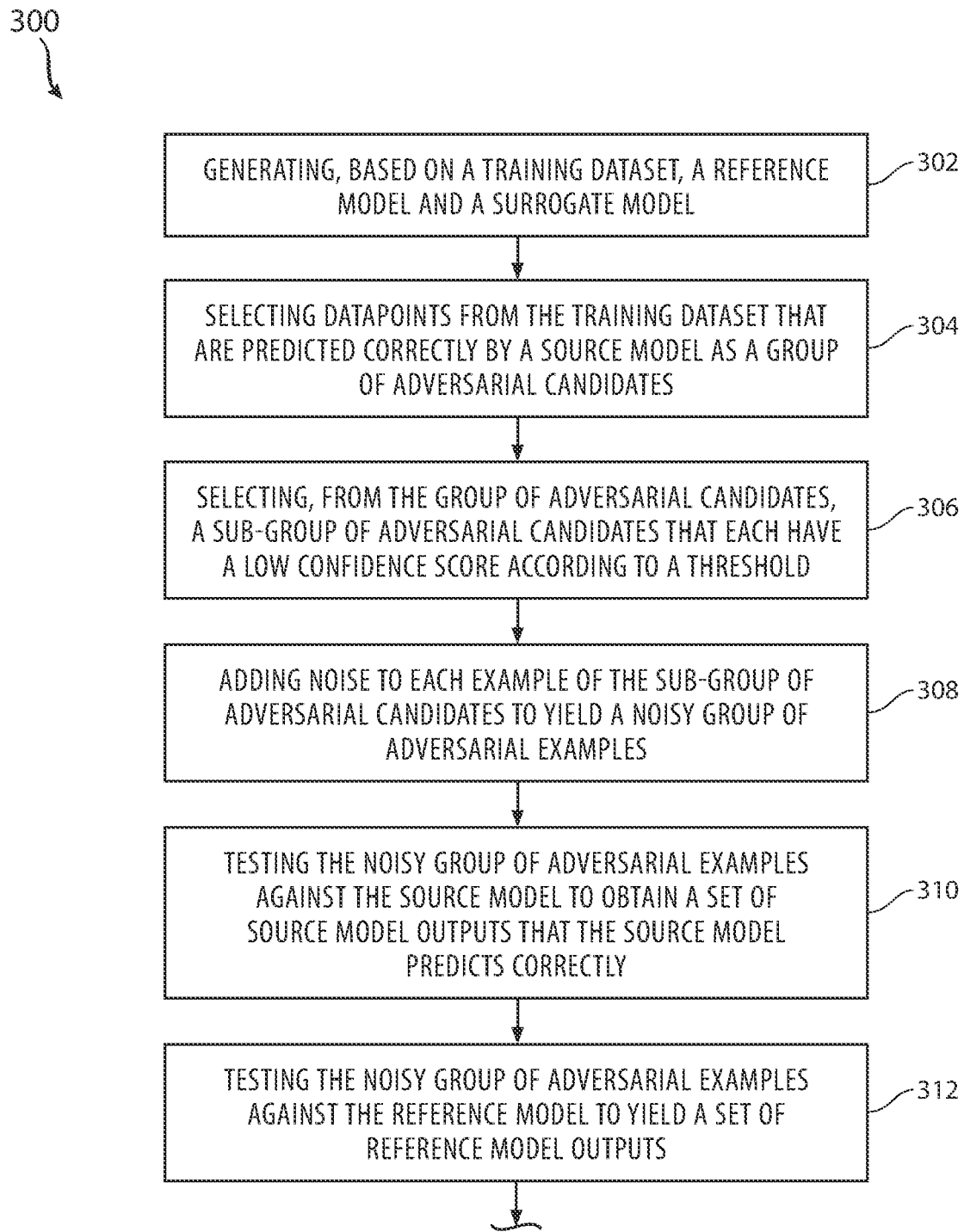
FIG. 3 illustrates an example method related to adding noise to a sub-group of adversarial candidates.
Figure 3:
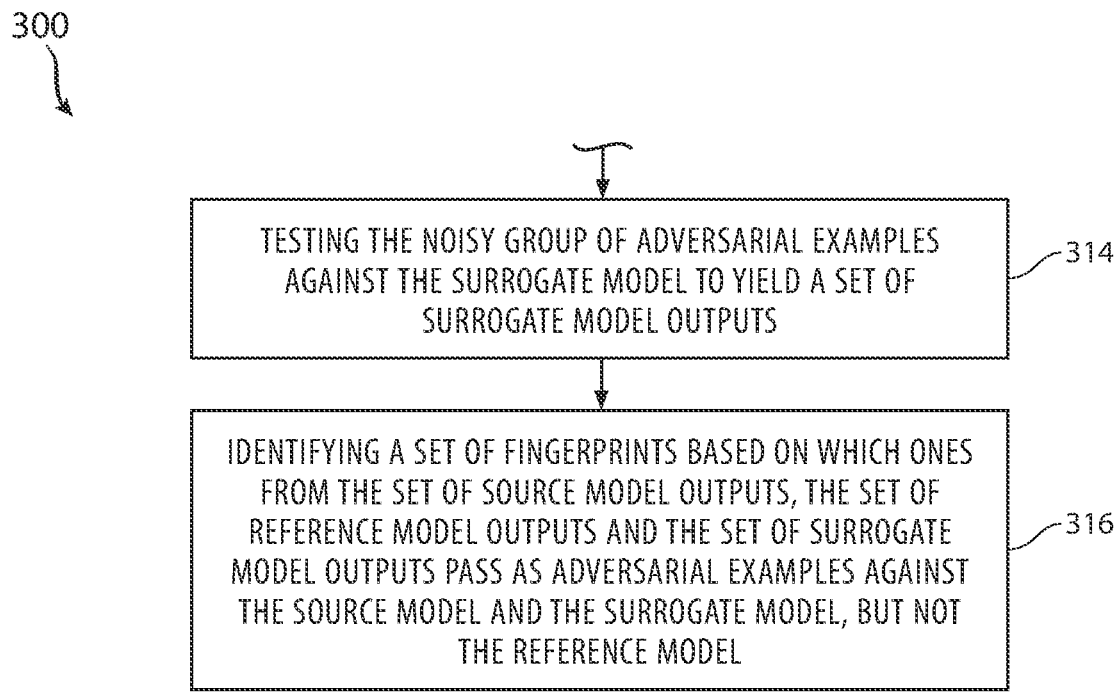
Figure 4:
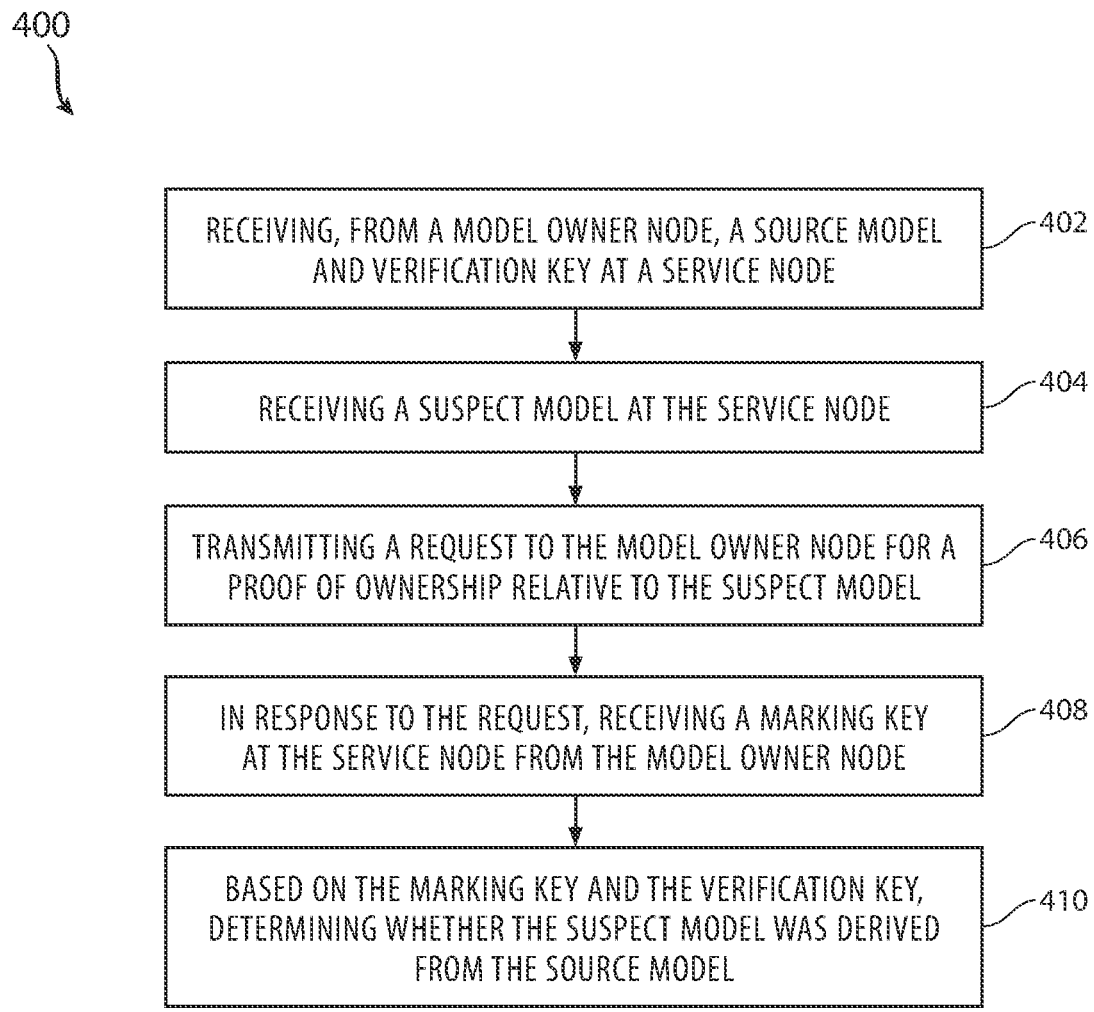
FIG. 4 illustrates an example method related to request for a marking key from a model owner to confirm or verify whether a suspect model was derived from a source model.
Figure 5:
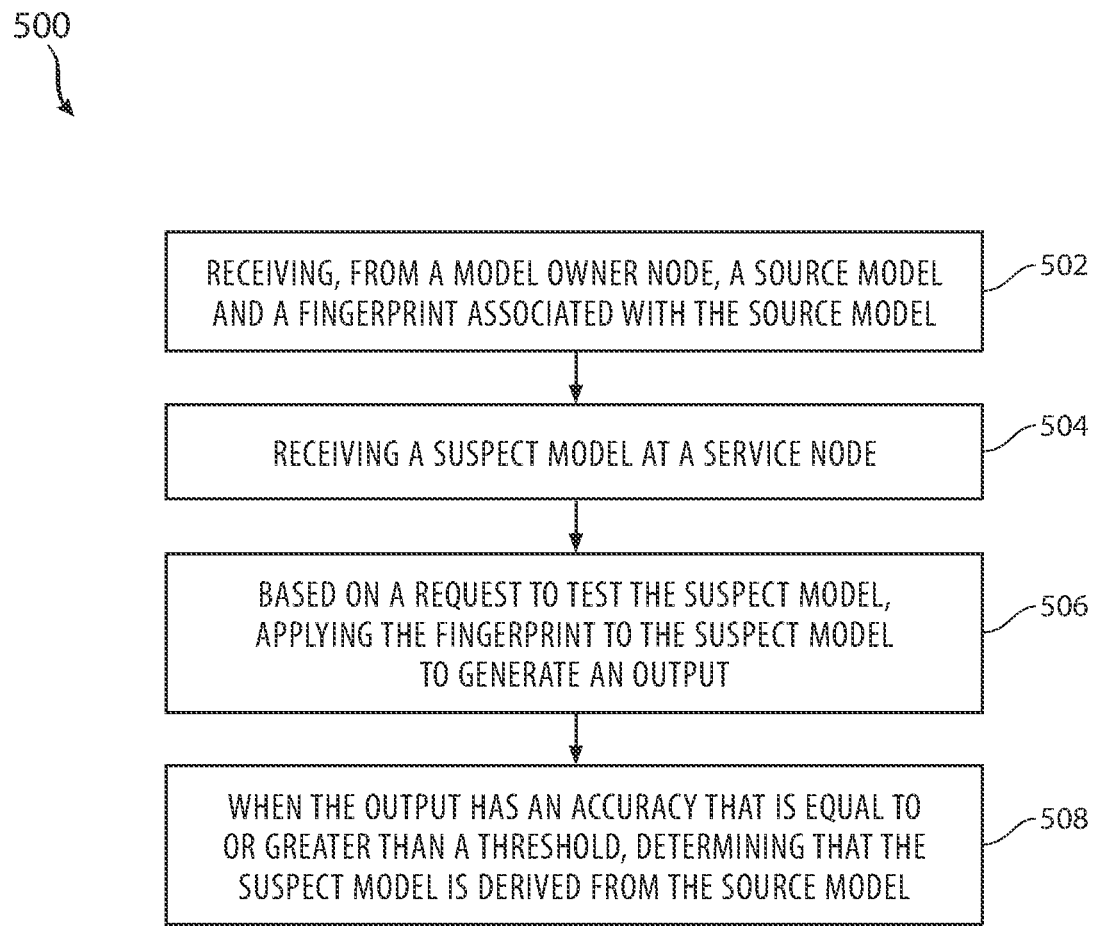
FIG. 5 illustrates an example method related to applying a fingerprint to a suspect model to determine whether it was derived from a source model.

FIGS. 3-5 illustrate various example methods according to this disclosure. One example method 300 is shown in FIG. 3 that addresses the steps for generating a set of fingerprints that can include generating, based on a training dataset, a reference model and a surrogate model (302), selecting datapoints from the training dataset that are predicted correctly by a source model as a group of adversarial candidates (304), selecting, from the group of adversarial candidates, a sub-group of adversarial candidates that each have a low confidence score according to a threshold (306) and adding noise to each candidate of the sub-group of adversarial candidates to yield a noisy group of adversarial examples (308).

The method can further include testing the noisy group of adversarial examples against the source model to obtain a set of source model outputs that the source model predicts correctly (310), testing the noisy group of adversarial examples or fingerprint candidates against the reference model to yield a set of reference model outputs (312), testing the noisy group of adversarial examples against the surrogate model to yield a set of surrogate model outputs (314) and identifying a set of fingerprints based on which ones from the set of source model outputs, the set of reference model outputs and the set of surrogate model outputs pass as adversarial examples against the source model and the surrogate model, but not the reference model (316). Step 316 indicates which of the noisy group of adversarial examples will pass as the set of fingerprints which can be utilized to determine whether a suspect model is trained or embedded with data or knowledge copied from the source model. The method can include any one or more of the steps performed in any order.

The training dataset can be from a same distribution of a source model dataset. In one aspect, the training dataset includes at least some data from a source model dataset. In another aspect, the fingerprint candidates or the noisy group of adversarial examples includes ones of the group of fingerprint candidates that lead to a fully successful adversarial attack accuracy against the source model.

The method 300 can further include sharing a hashed version of the set of fingerprints with a trusted third party as shown in FIG. 2. The step of generating the set of fingerprints further can further include constructing respective adversarial examples with the noise that causes a receiving model to misclassify an input. The noise can be imperceptible noise. The method can further include testing a suspect model by using the set of fingerprints against the suspect model to determine whether an overall accuracy operating on the set of fingerprints is equal to or greater than a testing threshold. The method can also include determining, when the overall accuracy operating on the set of fingerprints is equal to or greater than the testing threshold, that the suspect model was derived from the source model.

An example method 400 is shown in FIG. 4 which focuses on the testing process for determining whether a suspect model is derived from the source model. The example method can include receiving, from a model owner node, a source model and verification key at a service node (402), receiving a suspect model at the service node (404) and transmitting a request to the model owner node for a proof of ownership relative to the suspect model (406). In response to the request, the method can include receiving a marking key at the service node from the model owner node (408) and, based on the marking key and the verification key, determining whether the suspect model was derived from the source model (410).

Determining whether the suspect model was derived from the source model can further include testing the suspect model to determine whether a noisy adversarial example produces a same output from both the source model and the suspect model. The noisy adversarial example can pass against the source model and a surrogate model, but not a reference model. In one aspect, at least one of the marking key and the verification key can include added noise which causes a predictable output from the source model and surrogate models derived therefrom.

Another example method 500 is shown in FIG. 5 and can include receiving, from a model owner node, a source model and a fingerprint associated with the source model (502), receiving a suspect model at a service node (504), based on a request to test the suspect model, applying the fingerprint to the suspect model to generate an output (506) and, when the output has an accuracy that is equal to or greater than a threshold, determining that the suspect model is derived from the source model (506).

The method of FIG. 5 can include an aspect wherein the fingerprint is generated by a process including generating, based on a training dataset, a reference model and a surrogate model, selecting datapoints from the training dataset that are predicted correctly by the source model as a group of adversarial candidates, selecting from the group of adversarial examples a sub-group of candidates that each have a low confidence score according to a threshold and adding noise to each candidate of the sub-group of adversarial candidates to yield adversarial examples or fingerprint candidates.

The method can further include testing the fingerprint candidates against the source model to obtain a set of source model outputs that the source model predicts correctly, testing the set of source model outputs against the reference model to yield a set of reference model outputs, testing the set of source model outputs against the surrogate model to yield a set of surrogate model outputs and identifying the fingerprint based on which ones from the set of source model outputs, the set of reference model outputs and the set of surrogate model outputs pass as adversarial examples against the source model and the surrogate model, but not the reference model.

In one aspect, the fingerprint candidates can include ones of the group of adversarial examples that lead to a fully successful adversarial attack accuracy against the source model.

The method can further include sharing a hashed version of the fingerprint with a trusted third party 206 as shown in FIG. 2. The step of generating the fingerprint further can include constructing respective adversarial examples with the noise that causes a receiving model to misclassify an input. The threshold can be any chosen threshold, such as 0.60 or approximately 0.60, which can encompass the threshold and +/−30% of the threshold.

Figure 6:
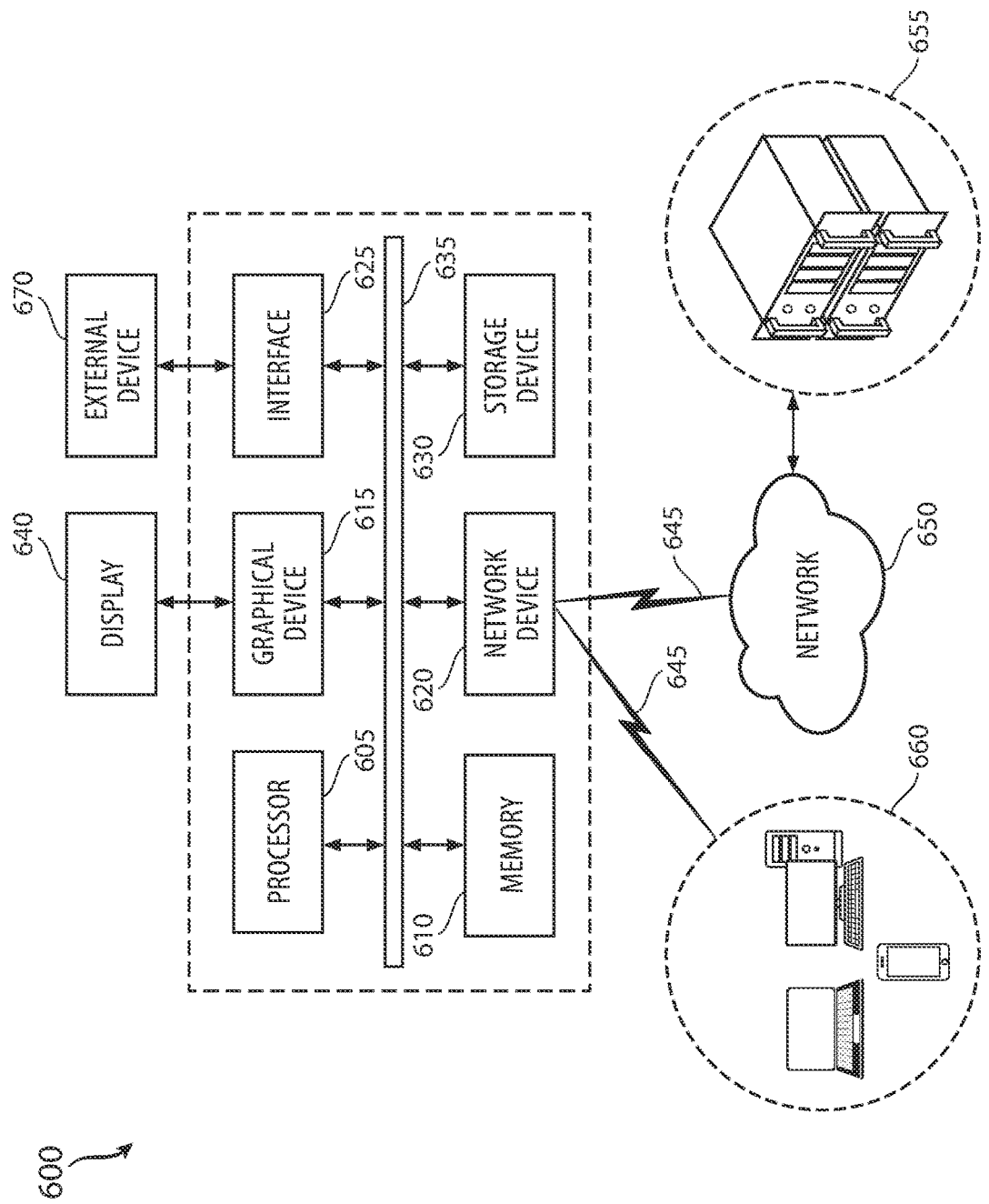
FIG. 6 illustrates an example system or device according to some aspects of this disclosure.

FIG. 6 illustrates an example computer system 600 for implementing a part of the instant disclosure. For example, the example computer system 600 may execute a client application for performing the instant disclosure.

The example computer system 600 includes a processor 605, a memory 610, a graphical device 615, a network device 620, interface 625, and a storage device 630 that are connected to operate via a bus 635. The processor 605 reads causes machine instructions (e.g., reduced instruction set (RISC), complex instruction set (CISC), etc.) that are loaded into the memory 610 via a bootstrapping process and executes an operating system (OS) for executing application within frameworks provided by the OS. For example, the processor 605 may execute an application that executes an application provided by a graphical framework such as Winforms, Windows Presentation Foundation (WPF), Windows User Interface (WinUI), or a cross platform user interface such as Xamarin or QT. In other examples, the processor 605 may execute an application that is written for a sandbox environment such as a web browser.

The processor 605 controls the memory 610 to store instructions, user data, operating system content, and other content that cannot be stored within the processor 605 internally (e.g., within the various caches). The processor 605 may also control a graphical device 615 (e.g., a graphical processor) that outputs graphical content to a display 640. In some examples, the graphical device 615 may be integral within the processor 605. In yet another example, the display 640 may be integral with the computer system 600 (e.g., a laptop, a tablet, a phone, etc.).

The graphical device 615 may be optimized to perform floating point operations such as graphical computations, and may be configured to execute other operations in place of the processor 605. The processor 605 may be controlled by instructions to perform mathematical operations optimized for floating point math. For example, the processor 605 may allocate instructions to the graphical device 615 for operations that are optimized for the graphical device 615. For instance, the graphical device 615 may execute operations related to artificial intelligence (AI), natural language processing (NLP), vector math. The results may be returned to the processor 605. In another example, the application executing in the processor 605 may provide instructions to cause the processor 605 to request the graphical device 615 to perform the operations. In other examples, the graphical device 615 may return the processing results to another computer system (i.e, distributed computing).

The processor 605 may also control a network device 620 that transmits and receives data using a plurality of wireless channels 645 and at least one communication standard (e.g., Wi-Fi (i.e., 802.11ax, 802.11e, etc.), Bluetooth®, various standards provided by the 3rd Generation Partnership Project (e.g., 3G, 4G, 5G), or a satellite communication network (e.g., Starlink). The network device 620 may wirelessly connect to a network 650 to connect to servers 655 or other service providers. The network device 620 may also be connected to the network 650 via a physical (i.e., circuit) connection. The network device 620 may also directly connect to local electronic device 660 using a point-to-point (P2P) or a short range radio connection.

The processor 605 may also control an interface 625 that connects with an external device 670 for bidirectional or unidirectional communication. The interface 625 is any suitable interface that forms a circuit connection and can be implemented by any suitable interface (e.g., universal serial bus (USB), Thunderbolt, and so forth). The external device 665 is able to receive data from the interface 625 to process the data or perform functions for different applications executing in the processor 605. For example, the external device 665 may be another display device, a musical instrument, a computer interface device (e.g., a keyboard, a mouse, etc.), an audio device (e.g., an analog-to-digital converter (ADC), a digital-to-analog converter (DAC)), a storage device for storing content, an authentication device, an external network interface (e.g., a 5G hotspot), a printer, and so forth.

It is noted that in one aspect, the steps disclosed herein can be practiced by a "system." The system can include the server and one or more clients together, or might just be functionality performed by the server. The system could also be a client or a group of clients, such as clients in a particular geographic area or client groups in some manner that are performing the client-based functions disclosed herein. Claims can be included which outline the steps that occur from the standpoint of any device disclosed herein. For example, the steps of transmission, calculation, and receiving of data can be claimed from the standpoint of a server device, a client device, or group of client devices depending on which embodiment is being covered. All such communication from the standpoint of an individual component or device can be included as within the scope of a particular embodiment focusing on that device.

In another aspect, the system can include a platform as disclosed in the patent applications incorporated by reference also performing steps in coordination with the concept disclosed above. Therefore, the platform as used to provide the federated-split learning process described herein is also an embodiment of this disclosure and steps can be recited in connection with the use of that platform for training models in a manner that maintains privacy of the data as described herein.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

Note that each dependent claim below could also be recited as being dependent on any previous claim and not just a single previous claim. Thus, each feature of any example disclosed herein could be combined with any feature of any other example disclosed herein. Furthermore, the concept can be covered from the viewpoint of any node in the network.

Bank of Statements

Statement 1. A method comprising:
generating, based on a training dataset, a reference model and a surrogate model;
selecting datapoints from the training dataset that are predicted correctly by a source model as a group of adversarial candidates;
selecting, from the group of adversarial candidates, a sub-group of candidates that each have a low confidence score according to a threshold to yield a sub-group of adversarial candidates;
adding noise to each candidate of the sub-group of adversarial candidates to yield a noisy group of adversarial examples;
testing the noisy group of adversarial examples against the source model to obtain a set of source model outputs that the source model predicts correctly;
testing the set of source model successful adversarial examples against the reference model to yield a set of reference model outputs;
testing the set of source model successful adversarial examples against the surrogate model to yield a set of surrogate model outputs; and
identifying a set of fingerprints based on which ones from the set of source model outputs, the set of reference model outputs and the set of surrogate model outputs pass as adversarial examples against the source model and the surrogate model, but not the reference model.

Statement 2. The method of statement 1, wherein the training dataset is from a same distribution of a source model dataset.

Statement 3. The method of any previous statement, wherein the training dataset comprises at least some data from a source model dataset.

Statement 4. The method of any previous statement, wherein fingerprint candidates comprise ones of the noisy group of adversarial examples that lead to a fully successful adversarial attack accuracy against the source model.

Statement 5. The method of any previous statement, further comprising:
sharing a hashed version of the set of fingerprints with a trusted third party.

Statement 6. The method of any previous statement, wherein generating the set of fingerprints further comprises constructing respective adversarial examples with the noise that causes a receiving model to misclassify an input.

Statement 7. The method of any previous statement, wherein the noise is imperceptible noise.

Statement 8. The method of any previous statement, further comprising:
testing a suspect model by using the set of fingerprints against the suspect model to determine whether an overall accuracy operating on the set of fingerprints is equal to or greater than a testing threshold.

Statement 9. The method of any previous statement, further comprising:
determining, when the overall accuracy operating on the set of fingerprints is equal to or greater than the testing threshold, that the suspect model was derived from the source model.

Statement 10. A method comprising:
receiving, from a model owner node, a source model and verification key at a service node;
receiving a suspect model at the service node;
transmitting a request to the model owner node for a proof of ownership relative to the suspect model;
in response to the request, receiving a marking key at the service node from the model owner node; and
based on the marking key and the verification key, determining whether the suspect model was derived from the source model.

Statement 11. The method of statement 10, wherein determining whether the suspect model was derived from the source model further comprises testing the suspect model to determine whether a fingerprint produces a same output from both the source model and the suspect model.

Statement 12. The method of any previous statement, wherein the fingerprint passes against the source model and a surrogate model, but not a reference model.

Statement 13. The method of any previous statement, wherein at least one of the marking key and the verification key comprises added noise which causes a predictable output from the source model and surrogate models derived therefrom.

Statement 14. A method comprising:
receiving, from a model owner node, a source model and a fingerprint associated with the source model;
receiving a suspect model at a service node;
based on a request to test the suspect model, applying the fingerprint to the suspect model to generate an output; and
when the output has an accuracy that is equal to or greater than a threshold, determining that the suspect model is derived from the source model.

Statement 15. The method of statement 14, wherein the fingerprint is generated by a process comprising:
generating, based on a training dataset, a reference model and a surrogate model;
selecting datapoints from the training dataset that are predicted correctly by the source model as a group of adversarial candidates;
selecting from the group of adversarial candidates a sub-group of candidates that each have a low confidence score according to a threshold to yield a sub-group of adversarial candidates;
adding noise to each candidate of the sub-group of adversarial candidates to yield a noisy group of adversarial examples;

testing the noisy group of adversarial examples against the source model to obtain a set of source model successful adversarial examples that the source model predicts correctly;

testing the set of source model successful adversarial examples against the reference model to yield a set of reference model outputs;

testing the set of source model successful adversarial examples against the surrogate model to yield a set of surrogate model outputs; and identifying the fingerprint based on which ones from the set of source model successful adversarial examples, the set of reference model outputs and the set of surrogate model outputs pass as adversarial examples against the source model and the surrogate model, but not the reference model.

Statement 16. The method of any previous statement, wherein the noisy group of adversarial examples comprises ones of the group of adversarial candidates that lead to a fully successful adversarial attack accuracy against the source model.

Statement 17. The method of any previous statement, further comprising:

sharing a hashed version of the fingerprint with a trusted third party.

Statement 18. The method of any previous statement, wherein generating the fingerprint further comprises constructing respective adversarial examples with the noise that causes a receiving model to misclassify an input.

Statement 19. The method of any previous statement, wherein the noise is imperceptible noise.

Statement 20. The method of any previous statement, wherein the threshold is approximately 0.60.

Statement 21. A system having a processor and a computer-readable storage medium storing instructions which, when executed by the processor, cause the processor to perform a method of any previous statement.

Statement 22. A non-transitory computer-readable storage device storing instructions which, when executed by a processor, cause the processor to perform a method of any previous statement.

What is claimed is:

1. A method comprising:
generating a set of fingerprints by:
generating, based on a training dataset, a reference model and a surrogate model;
selecting data points from the training dataset that are predicted correctly by a source model as a group of adversarial candidates;
selecting, from the group of adversarial candidates, a sub-group of candidates that each have a low confidence score according to a threshold to yield a sub-group of adversarial candidates;
adding noise to each candidate of the sub-group of adversarial candidates to yield a noisy group of adversarial examples;
testing the noisy group of adversarial examples against the source model to obtain a set of source model outputs that the source model predicts correctly;
testing the noisy group of adversarial examples against the reference model to yield a set of reference model outputs;
testing the noisy group of adversarial examples against the surrogate model to yield a set of surrogate model outputs;
and identifying the set of fingerprints based on which ones from the set of source model outputs, the set of reference model outputs and the set of surrogate model outputs pass as adversarial examples against the source model and the surrogate model, but not the reference model;
receiving a suspect model at a service node;
receiving, from a model owner node, a source model and a fingerprint of the set of fingerprints associated with the source model;
based on a request to test the suspect model, applying the fingerprint of the set of fingerprints to the suspect model to generate an output;
and when the output has an accuracy that is equal to or greater than a threshold, determining that the suspect model is derived from the source model.

2. The method of claim 1, wherein the training dataset is from a same distribution of a source model dataset.

3. The method of claim 1, wherein the training dataset comprises at least some data from a source model dataset.

4. The method of claim 1, wherein fingerprint candidates comprise ones of the noisy group of adversarial examples that lead to a fully successful adversarial attack accuracy against the source model.

5. The method of claim 1, further comprising:
sharing a hashed version of the set of fingerprints with a trusted third party.

6. The method of claim 1, wherein generating the fingerprint further comprises constructing respective adversarial examples with the noise that causes a receiving model to misclassify an input.

7. The method of claim 5, wherein the noise is imperceptible noise.

8. The method of claim 1, further comprising:
testing a suspect model by using the fingerprint against the suspect model to determine whether an overall accuracy operating on the fingerprint is equal to or greater than the threshold.

9. The method of claim 8, further comprising:
determining, when the overall accuracy operating on the fingerprint is equal to or greater than the threshold, that the suspect model was derived from the source model.

10. A system comprising:
one or more processors; and
a computer-readable storage device storing instructions which, when executed by the one or more processors, cause the one or more processors to perform operations comprising:
generating a set of fingerprints by:
generating, based on a training dataset, a reference model and a surrogate model;
selecting data points from the training dataset that are predicted correctly by a source model as a group of adversarial candidates;
selecting, from the group of adversarial candidates, a sub-group of candidates that each have a low confidence score according to a threshold to yield a sub-group of adversarial candidates;
adding noise to each candidate of the sub-group of adversarial candidates to yield a noisy group of adversarial examples;
testing the noisy group of adversarial examples against the source model to obtain a set of source model outputs that the source model predicts correctly;

testing the noisy group of adversarial examples against the reference model to yield a set of reference model outputs;

testing the noisy group of adversarial examples against the surrogate model to yield a set of surrogate model outputs; and identifying the set of fingerprints based on which ones from the set of source model outputs, the set of reference model outputs and the set of surrogate model outputs pass as adversarial examples against the source model and the surrogate model, but not the reference model;

receiving a suspect model at a service node;

receiving, from a model owner node, a source model and a fingerprint of the set of fingerprints associated with the source model;

based on a request to test the suspect model, applying the fingerprint of the set of fingerprints to the suspect model to generate an output; and when the output has an accuracy that is equal to or greater than a threshold, determining that the suspect model is derived from the source model.

11. The system of claim 10, wherein the training dataset is from a same distribution of a source model dataset.

12. The system of claim 10, wherein the training dataset comprises at least some data from a source model dataset.

13. The system of claim 10, wherein fingerprint candidates comprise ones of the noisy group of adversarial examples that lead to a fully successful adversarial attack accuracy against the source model.

14. The system of claim 10, wherein the computer-readable storage device stores additional instructions which, when executed by the one or more processors, cause the one or more processors to perform operations further comprising:

sharing a hashed version of the set of fingerprints with a trusted third party.

15. The system of claim 10, wherein generating the set of fingerprints further comprises constructing respective adversarial examples with the noise that causes a receiving model to misclassify an input.

16. The system of claim 15, wherein the noise is imperceptible noise.

17. The system of claim 10, wherein the computer-readable storage device stores additional instructions which, when executed by the one or more processors, cause the one or more processors to perform operations further comprising:

testing a suspect model by using the fingerprint against the suspect model to determine whether an overall accuracy operating on the fingerprint is equal to or greater than the threshold.

18. The system of claim 17, wherein the computer-readable storage device stores additional instructions which, when executed by the one or more processors, cause the one or more processors to perform operations further comprising:

determining, when the overall accuracy operating on the fingerprint is equal to or greater than the threshold, that the suspect model was derived from the source model.

19. A system comprising:

one or more processors; and a computer-readable storage device storing instructions which, when executed by the one or more processors, cause the one or more processors to perform operations comprising receiving a suspect model; and based on a marking key and a verification key, determining whether the suspect model was derived from a source model by testing the suspect model to determine whether a fingerprint of a set of fingerprints produces a same output from both the source model and the suspect model, wherein the fingerprint of the set of fingerprints passes against the source model and a surrogate model, but not a reference model, wherein the fingerprint of the set of fingerprints is generated by a process comprising:

generating, based on a training dataset, a reference model and a surrogate model;

selecting datapoints from the training dataset that are predicted correctly by a source model as a group of adversarial candidates;

selecting, from the group of adversarial candidates, a sub-group of candidates that each have a low confidence score according to a threshold to yield a sub-group of adversarial candidates;

adding noise to each candidate of the sub-group of adversarial candidates to yield a noisy group of adversarial examples;

testing the noisy group of adversarial examples against the source model to obtain a set of source model successful adversarial examples that the source model predicts correctly;

testing the noisy group of adversarial examples against the reference model to yield a set of reference model outputs;

testing the set of source model successful adversarial examples against the surrogate model to yield a set of surrogate model outputs; and identifying the fingerprint of the set of fingerprints based on which ones from the set of source model successful adversarial examples, the set of reference model outputs and the set of surrogate model outputs pass as adversarial examples against the source model and the surrogate model, but not the reference model.

* * * * *